US011511592B2

(12) United States Patent
Kaldas

(10) Patent No.: US 11,511,592 B2
(45) Date of Patent: Nov. 29, 2022

(54) SUSPENSION SYSTEM FOR A VEHICLE

(71) Applicant: Ford Global Technologies, LLC, Dearborn, MI (US)

(72) Inventor: Mina Kaldas, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 17/114,876

(22) Filed: Dec. 8, 2020

(65) Prior Publication Data

US 2021/0178850 A1 Jun. 17, 2021

(30) Foreign Application Priority Data

Dec. 12, 2019 (DE) .......................... 102019134151.5

(51) Int. Cl.
*F16F 9/22* (2006.01)
*B60G 17/08* (2006.01)
*B60G 13/08* (2006.01)

(52) U.S. Cl.
CPC ............. *B60G 17/08* (2013.01); *B60G 13/08* (2013.01); *B60G 2202/24* (2013.01); *B60G 2400/10* (2013.01); *B60G 2400/82* (2013.01); *B60G 2500/11* (2013.01)

(58) Field of Classification Search
CPC .... B60G 13/08; B60G 15/06; B60G 17/0416; B60G 17/08; F16F 9/22; F16F 9/26; F16F 9/46; F16F 9/185; F16F 9/326
USPC ............ 188/266.5, 310, 312, 322.13, 322.18
See application file for complete search history.

(56) References Cited

U.S. PATENT DOCUMENTS

| 2,917,303 | A | * | 12/1959 | Vierling ................. B60G 15/06 267/221 |
|-----------|---|---|---------|----------------------------------------------|
| 4,506,869 | A |   | 3/1985  | Masclet et al.                               |
| 4,662,486 | A | * | 5/1987  | Stenberg ................... A61F 2/68 16/56  |
| 4,960,291 | A |   | 10/1990 | Lin                                          |
| 5,096,026 | A | * | 3/1992  | Vautour ........... A63B 21/00069 188/314    |
| 5,337,864 | A |   | 8/1994  | Sjöström                                     |

(Continued)

FOREIGN PATENT DOCUMENTS

DE 4125285 C2 12/1996
EP 1902874 A1 3/2008

*Primary Examiner* — Christopher P Schwartz
(74) *Attorney, Agent, or Firm* — Burr & Forman, LLP; Greg Brown

(57) ABSTRACT

A suspension system for a vehicle includes a shock absorber unit operably coupled between a vehicle body and a wheel carrier. The shock absorber unit includes a first damper unit having a first cylinder chamber, a second damper unit having a second cylinder chamber, a first piston connected to a first piston rod, a second piston connected to a second piston rod, and an adjusting unit. The first and second cylinder chambers may each be filled with a fluid. The first and second cylinder chambers may be formed in a common cylinder unit and sealed off from one another. The first and second piston rods may be arranged axially displaceable in the first and second cylinder chambers, respectively. The first piston rod is operably coupled to the vehicle body and the second piston rod is operably coupled to the wheel carrier. Damping actions of the first and second damper units are changed independently of one another by the adjusting unit.

20 Claims, 1 Drawing Sheet

(56) References Cited

U.S. PATENT DOCUMENTS

Figure 2:
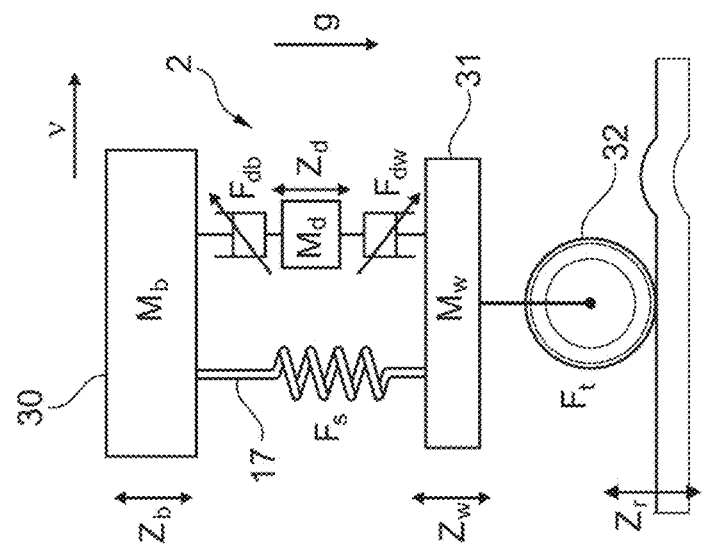

| | | | | |
|---|---|---|---|---|
| 5,746,335 | A * | 5/1998 | Brough | B61G 9/08 |
| | | | | 188/312 |
| 6,321,888 | B1 * | 11/2001 | Reybrouck | F16F 9/325 |
| | | | | 188/313 |
| 7,413,062 | B2 * | 8/2008 | Vandewal | B60G 17/0416 |
| | | | | 188/266.5 |
| 7,478,708 | B2 * | 1/2009 | Bugaj | B60G 21/073 |
| | | | | 280/124.159 |
| 8,874,291 | B2 | 10/2014 | Gresser | |
| 9,062,737 | B2 * | 6/2015 | Hoult | F16F 9/26 |
| 2019/0136932 | A1 * | 5/2019 | Deferme | F16F 9/185 |

* cited by examiner

SUSPENSION SYSTEM FOR A VEHICLE

TECHNICAL FIELD

Example embodiments generally relate to motor vehicle suspension systems and, more particularly, relate to a suspension system with an independent dual valve semi-active damper.

BACKGROUND

In motor vehicles a wheel carrier, on which the vehicle wheel is supported, is normally connected to the vehicle body, typically to the chassis or to a subframe, by way of one or more suspension links. Whilst the suspension links absorb predominantly horizontal forces, (static and dynamic) forces acting in a vertical direction are absorbed by at least one spring and a shock absorber, which are connected on the one hand to the vehicle body and on the other either to the wheel carrier or a suspension link. The damping characteristic of the shock absorber is of particular importance here for the ride comfort on the one hand and for optimum road grip of the vehicle wheel on the other. In addition to passive dampers, in which the damping is constant whilst driving, semi-active dampers are also known, in which the damping characteristic can be continuously varied. A problem with this is that an optimum ride comfort requires a relatively soft damper behavior, whilst a relatively hard damper behavior is best for road grip, having regard to the wheel acceleration and the dynamic wheel load. Reliance is therefore placed on a compromise, which is less than ideal with regard to both requirements and ultimately favors road grip at the expense of ride comfort.

U.S. Pat. No. 5,337,864 discloses a suspension system which comprises passive primary spring suspension together with a damping cylinder, which is connected in parallel with the primary spring suspension between a sprung and an and unsprung mass, the damping cylinder being divided into multiple chambers holding damping fluid, the volume of each chamber varying as a function of a relative movement between the unsprung and the sprung mass. The filling and draining of the chambers are controlled by flow control devices. The housing of the damping cylinder forms a third mass, which is resiliently connected to the unsprung mass by secondary spring suspension, and the damping cylinder receives two pistons, which run forming a seal in relation to the inner circumferential surface of the cylinder. The first piston and the second piston are connected to the sprung and unsprung mass respectively by means of piston rods and the pistons divide the cylinder into three chambers, which hold damping fluid.

U.S. Pat. No. 7,478,708 discloses a shock absorber, which comprises a first cylinder and a second cylinder, which are oriented axially and each comprise a fluid-filled piston chamber. An axially displaceable piston is received in each piston chamber and dampers are formed for damping the axial displacement of the piston. A piston rod extends axially between the first and second piston chamber. A first and a second axial end of the piston rod are connected to the first and second piston respectively. According to another embodiment two piston rods with associated first and second pistons are provided. Each piston is arranged in one of two piston chambers, which are formed inside a cylinder and are connected by way of connecting lines to a gas cylinder. The gas cylinder is divided by two moveable piston elements into three portions, the connecting lines opening into the outer portions.

DE 41 25 285 C2 discloses a cylinder-piston unit, having a piston rod led out via a cylinder end and forming a seal, two coaxially arranged pistons moveable independently of one another between two positions corresponding to limit positions of the unit, and a pressure supply with cylinder-side connection, by which the pistons are held in two limit positions when subjected to pressure with the piston rod extended to a mid-overall length of the cylinder-piston unit. The pistons are arranged in two cylinder chambers separated from one another by an intermediate dividing wall and are each firmly connected to a piston rod protruding towards the side remote from the dividing wall. The cylinder chambers are of different lengths and each cylinder chamber is provided with two connections provided in the area of the cylinder ends for supplying pressure.

U.S. Pat. No. 8,874,291 shows vehicles for transporting persons and/or goods, which alternatively travel on water, land or in the air and at least partially use electrical energy and electric motors as drive means, the electrical energy used being generated predominantly within the vehicle. Among other things, the electrical energy is obtained from vertical acceleration movements of the vehicle body, vehicle wheels and wheel suspensions. Thus, for example, a cylinder of a shock absorber may comprise three chambers, the lowest of which is defined upwardly by a rigid wall and downwardly by a moveable pressure piston. The upper and the middle chambers are separated by a piston, which is connected by a piston rod passing through the wall to an actuator of a linear generator. The stator of the linear generator is fixedly arranged on the pressure piston.

U.S. Pat. No. 4,960,291 discloses a suspension system having a suspension cylinder, which is arranged between a vehicle body and a transverse link of the vehicle wheel. A hydraulic device comprises two hydraulic cylinders, each of which comprises a piston and a piston rod. A combination of a coil spring and a shock absorber is arranged between two piston rods and is acted upon by these. A control device is designed to control the flow of hydraulic fluid from the suspension cylinder to one of the two hydraulic cylinders. One of the cylinders has a larger diameter than the suspension cylinder and the other cylinder has a smaller diameter than the suspension cylinder.

EP 1 902 874 A1 discloses an active chassis system for a motor vehicle, which comprises at least one hydraulic actuator arranged between at least one wheel and the body of the motor vehicle or between two wheels, has at least one feed pump supplying at least the one hydraulic actuator with a hydraulic fluid and comprises a control valve unit for controlling the pressure inside the actuator. At least the one feed pump can be driven independently of a drive source of the motor vehicle and is designed for a delivery mode intermittently functioning at a higher frequency.

U.S. Pat. No. 4,506,869 discloses a shock absorber, having a plunger which is arranged sliding over a piston in a cylinder. At least two chambers of variable volume are thereby defined. Connections are provided via which the two chambers communicate, one of the chambers having a first elastic fluid at a first pressure and the other chamber having a second elastic fluid at a second pressure. The pressures are adjustable according to at least one parameter corresponding to a force to be absorbed.

In view of the prior art set forth, the adjustment of an optimum damping behavior of a wheel suspension, having regard to the ride comfort on the one hand and the ground contact of the wheels on the other, still affords room for improvements.

BRIEF SUMMARY OF SOME EXAMPLES

Some example embodiments may provide a suspension system for a motor vehicle. The suspension system may include a shock absorber unit operably coupled between a vehicle body and a wheel carrier. The shock absorber unit may include a first damper unit having a first cylinder chamber, a second damper unit having a second cylinder chamber, a first piston connected to a first piston rod, a second piston connected to a second piston rod, and an adjusting unit. The first and second cylinder chambers may each be filled with a fluid. The first and second cylinder chambers may be formed in a common cylinder unit and sealed off from one another. The first and second piston rods may be arranged axially displaceable in the first and second cylinder chambers, respectively. The first piston rod may be operably coupled to the vehicle body and the second piston rod is operably coupled to the wheel carrier. Damping actions of the first and second damper units are changed independently of one another by the adjusting unit.

BRIEF DESCRIPTION OF THE SEVERAL VIEWS OF THE DRAWING(S)

Figure 1:
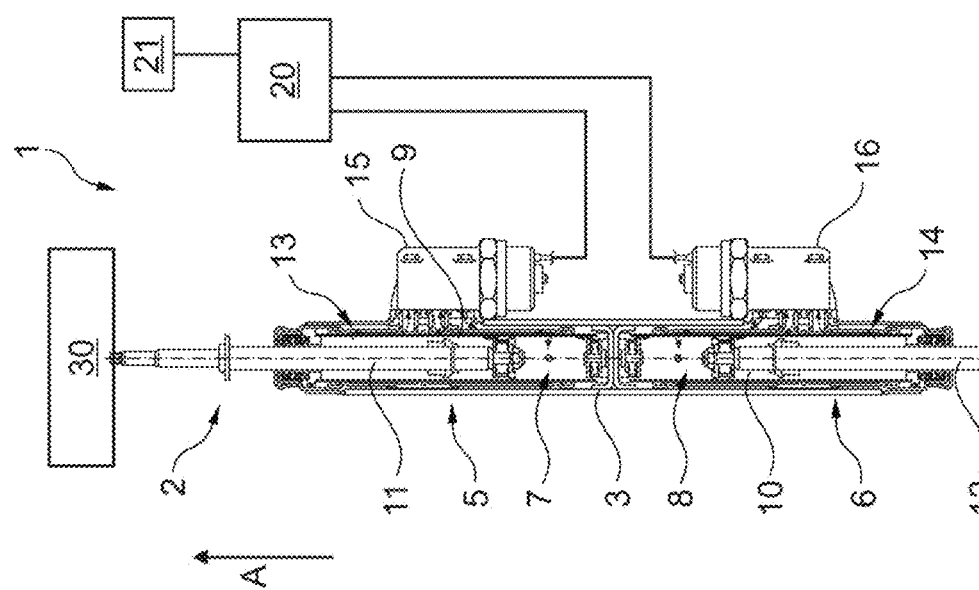

Having thus described the invention in general terms, reference will now be made to the accompanying drawings, which are not necessarily drawn to scale, and wherein:

FIG. 1 is a partially sectional representation of a suspension system according of an example embodiment; and FIG. 2 shows a diagrammatic representation of the suspension system and the forces and displacements according to of an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

Some example embodiments may provide an optimum damping behavior of a wheel suspension, having regard to the ride comfort on the one hand and the ground contact of the wheels on the other. In this regard, the term "suspension" should be understood to refer to the wheel suspension of the vehicle. The vehicle is a road vehicle, normally a motor vehicle such as a truck or passenger car, although the suspension system might also be used for trailers. The suspension system may also comprise components which do not belong to the actual wheel suspension.

In some example embodiments, the suspension system comprises a shock absorber unit, which in turn comprises a first damper unit and a second damper unit, each with a fluid-filled cylinder chamber. The cylinder chambers may be formed in a common cylinder unit and sealed off from one another. Each damper unit comprises a cylinder chamber, the term "cylinder" to be understood in terms of the function and in no way restrictive with regard to the cross section of the respective cylinder chamber. Each cylinder chamber constitutes a cavity, which in the operating state is filled with a fluid. The cylinder unit is normally a rigid body, inside which the two cylinder chambers are formed, which as first and second cylinder chamber belong to the first and the second damper unit respectively. The two cylinder chambers are sealed off from one another, that is to say they are separated from one another with regard to a possible exchange of fluid. This relates solely to a separation of the cylinder chambers one from another, whilst not excluding an exchange of fluid from one of the cylinder chambers with another line or another chamber.

In some embodiments, a piston connected to a piston rod is arranged axially displaceable in each cylinder chamber, and one piston rod is connected on the vehicle body-side whilst the other piston rod is connected on the wheel-side. Each respective piston is displaceable in a direction, hereinafter referred to as the axial direction, inside the cylinder chamber to which each respective piston belongs. Here the piston displaces or moves the fluid inside the cylinder chamber, the damping effect of the respective damper unit being based primarily on flow losses within the fluid. The cross section of the piston is normally matched to the internal cross section of the cylinder chamber, in such a way that it is guided inside the latter. Whilst the piston itself remains entirely within the cylinder chamber, it is connected to a piston rod, which is led out of the cylinder chamber. The piston rod normally, but not necessarily, has a significantly smaller cross section than the piston. Both the piston and the piston rod itself may be of single or multipart formation. It is also feasible for the piston, at least in part, to be formed in one piece with the piston rod. One of the piston rods is connected on the vehicle body-side, that is to say it is connected to the vehicle body directly or normally indirectly, for example via a joint or bearing. In this context "vehicle body" is a collective term for bodywork, chassis and any subframe, that is to say those elements that are normally to be classified as the sprung mass. The other piston rod is connected on the wheel-side, a direct or normally indirect connection being possible here also. The connection is located on the wheel-side, which includes the scope for connection to a wheel carrier or to a suspension link, which is in turn connected to the wheel carrier. Such a suspension link connects the wheel carrier to the vehicle body and serves, in a known manner, to guide the wheel carrier and at the same time to allow a movement of the wheel carrier in relation to the vehicle body. Overall, the damper unit is therefore arranged between the vehicle body and wheel carrier (possibly interposing a suspension link).

In various example embodiments, the damper unit, to which the piston rod connected on the vehicle body-side belongs, may also be referred to as the vehicle body-side damper unit, whilst the other damper unit may be termed the wheel-side damper unit.

The damping actions of the two damper units can be influenced independently of one another by at least one adjusting unit. The respective damping action of the damper unit here describes the damping characteristic, that is to say what counterforce is generated in the damper unit when the respective piston is displaced inside the cylinder chamber. The magnitude of the counterforce also depends on the rate of displacement. The suspension system comprises at least one adjusting unit, by means of which a damping action of the first damper unit and a damping action of the second damper unit can be influenced independently of one another. In this context "can be influenced" normally signifies "can be adjusted", it being understood that a desired adjustment is normally possible only with a limited degree of accuracy. Accordingly, it is possible to set a harder damping in one of the damper units than in the other damper unit. In particular, a softer damping can be set in the vehicle body-side damper unit than in the wheel-side damper unit.

In an example embodiment, the cylinder unit together with the fluid in the cylinder chambers and any other components may form a slow-acting mass, which is interposed between the vehicle body and the wheel carrier or suspension link and to a certain degree is moveable independently of both. The cylinder unit is coupled to the vehicle body via the vehicle body-side damper unit, whilst being coupled to the wheel carrier via the wheel-side damper unit. A movement of the wheel carrier occurring via the wheel-side damper unit does not ensue directly in relation to the vehicle body but primarily in relation to the cylinder unit. That is to say in this movement the decisive factor is the damping behavior of the wheel-side damper unit, which can be set correspondingly hard, in order to ensure optimum road grip. A movement of the vehicle body, on the other hand, occurring via the vehicle body-side damper unit, does not ensue directly in relation to the wheel carrier but likewise in relation to the cylinder unit. In this movement, the decisive factor is the damping behavior of the vehicle body-side damper unit, which can be set correspondingly soft, in order to ensure optimum ride comfort. Each of the damper units can be referred to all in all as a semi-active damper. Semi-active damping can be achieved with a substantially smaller technical outlay and with a lower weight or mass than fully active damping. The energy consumption, too, is substantially less compared to active damping. The suspension system according to example embodiments as described nevertheless affords positive effects which can otherwise be achieved only with active damping.

In order to assist in the independent influencing of the two damping actions, it is preferable for damping of the first damper unit to be influenced by a first adjusting unit and damping of the second damper unit by a second adjusting unit. In other words, the at least one adjusting unit mentioned above may include the first and second adjusting units. The first and second adjusting units are functionally each assigned to a respective one of the damper units, which does not necessarily mean, however, that they also have to be arranged in proximity or directly on the respective one of the damper units.

Basically, various possibilities exist with regard to the arrangement of the two cylinder chambers inside the cylinder unit. For example, the cylinder chambers could in part be arranged parallel to one another, which might possibly lead to problems, however, since an opposing action of forces on the part of the two piston rods would lead to a torque acting on the cylinder unit. In addition, it would be feasible for one cylinder chamber to at least partially enclose the other cylinder chamber, which is relatively costly in design terms, however. The two cylinder chambers may therefore be arranged axially in series. That is to say the two cylinder chambers may be arranged successively in the axial direction. This at the same time means that one of the cylinder chambers is arranged above the other cylinder chamber.

The damping inside a damper unit may in principle be influenced by various measures. Thus, it would be feasible to influence the flow resistance of the piston inside the cylinder chamber, in which case the piston could be of adjustable design and could have an adjustable element. Such a solution is generally technically expensive however. At least one adjusting unit preferably comprises a valve, in particular a solenoid valve, which is designed to influence a fluid flow inside a damper unit. To put it another way, a fluid flow inside the damper unit can be influenced, preferably adjusted, by the solenoid valve. The valve here may be continuously or non-continuously adjustable, in order to allow the setting of different flow rates or a different flow resistance for the fluid. The valve is preferably electrically controllable, e.g., via an embodiment in the form of a solenoid valve.

Whilst a piston is moving inside the cylinder chamber the fluid must have a facility for passing the piston. This might be inside the cylinder chamber, for example to the side of the piston or even through a valve inside the piston. With a view to a simple design and ease of maintenance, however, at least one damper unit may comprise a bypass duct running outside the cylinder chamber and connected to this on both sides, in which bypass duct a fluid flow can be influenced by an adjusting unit. The bypass duct allows the fluid to bypass the piston moving inside the cylinder chamber. The bypass duct may be connected to the cylinder chamber bilaterally, that is to say at both ends of the cylinder chamber. It can also be said that the bypass duct branches off from the cylinder chamber and opens back into the cylinder chamber. The corresponding connection points to the cylinder chamber are normally formed at the axial ends of the cylinder chamber. The bypass duct may be formed in a flexible or in particular rigid line which is connected to the cylinder unit. As the piston moves towards the end of the cylinder chamber, the fluid present there is forced into the bypass duct and further through the bypass duct to the opposite end of the cylinder chamber. The damping effect of the damper unit here is based largely on the flow resistance of the fluid inside the bypass duct. The adjusting unit, which may take the form in particular of a valve, is designed to influence the fluid flow through the bypass duct, which in turn results in a variation of the flow resistance and consequently the damping behavior. By arranging the bypass duct outside the cylinder chamber, it is also possible to arrange the adjusting unit outside on the cylinder unit, so that it is easily accessible when assembling and in the event of any repair.

Depending on the applied use, it would also be possible to design each damper unit as a pneumatic damper unit, in which the fluid would be a gas (for example air). Alternatively, the at least one damper unit may be designed as a hydraulic damper unit and for the associated cylinder chamber in the operating state to be filled with hydraulic fluid. Apart from the different damping behavior afforded by a hydraulic fluid compared to a gas, in the context of example embodiments, the higher density of hydraulic fluid compared to a gas, and the associated greater mass of the hydraulic fluid, may be preferable in some cases. This is added to the mass of the cylinder unit, which effectively helps to isolate the movements of the two damper units from one another.

In the aforementioned aspect of example embodiments, it may also be desirable for at least one adjusting unit to be carried by the cylinder unit. That is to say the adjusting unit is mounted directly or indirectly on the cylinder unit. In regard to the movement of the two damper units, the mass of the respective adjusting unit is therefore added to the mass of the cylinder unit. Apart from this advantage, it is generally simpler in design terms if the adjusting unit is mounted on the cylinder unit and together with this forms one assembly, which can be pre-assembled and then fitted at the time of assembly.

Since each of the damper units is only semi-active, these cannot undertake the actual spring suspension of the vehicle body in relation to the chassis. In order to achieve the necessary spring suspension, at least one spring element or a spring unit may be employed. The suspension system may therefor include at least one spring unit, which may be connected on the vehicle body-side and on the wheel-side, bypassing the shock absorber unit. That is to say the spring unit may be connected directly or indirectly to the vehicle body on the one hand and directly or indirectly to the wheel carrier or a suspension link on the other. The connection may be made bypassing the shock absorber unit, that is to say any flux of force between the vehicle body and the wheel carrier through the spring unit may be independent of the flux of force through the shock absorber unit. It could also be said that the shock absorber unit and at least the one spring unit are arranged in parallel with one another in respect of the flux of force. Were there to be any transmission of force from the spring unit to the cylinder unit, for example, this would alter the coupling of the cylinder unit to the vehicle body and to the wheel carrier, and would have a negative influence on the dynamics of the damper units in general. The respective spring unit may take any form, for example a coil spring or leaf spring.

The suspension system of some embodiments may include a control unit, which is designed to influence the damping actions automatically as a function of sensor data. The control unit may be connected to the at least one adjusting unit and actuate the at least one adjusting unit in order to influence the respective damping action. The sensor data may normally derive from vehicle sensors and may relate to the instantaneous state of the vehicle, for example, speed, acceleration or retardation, inclination and the like, but they may also relate to the vehicle environment, for example the nature and state of the running surface ahead of the vehicle. For example, the control unit might detect from the sensor data that the running surface ahead has uneven irregularities and in response could reduce the damping action of the vehicle body-side damper unit. In some cases, the control unit may be embodied as or include processing circuitry (e.g., including a processor and memory storing instructions that when executed perform the corresponding described functions).

FIG. 1 shows a partially sectional representation of a suspension system 1 according to an example embodiment for a motor vehicle, for example a passenger car. A shock absorber unit 2 is shown, which serves to connect a vehicle body 30 to the wheel carrier 31. The shock absorber unit 2 comprises a cylinder unit 3, which extends in an axial direction A. In the assembled state, the axial direction A corresponds precisely or approximately to the vertical. Inside the cylinder unit 3, a first cylinder chamber 7 and a second cylinder chamber 8 are formed, which are arranged in series in an axial direction, one above the other, as it were. The first cylinder chamber 7 is part of a first damper unit 5, which may also be referred to as the vehicle body-side damper unit. Inside the first cylinder chamber 7, a first piston 9 may be displaceably arranged. The first piston 9 may be connected to the vehicle body 30 via a first piston rod 11 in a manner not further represented. The second cylinder chamber 8 may be part of a second damper unit 6. A second piston 10 may be displaceably arranged in the axial direction A in the second cylinder chamber 8 and may be connected to the wheel carrier 31 via a second piston rod 12, likewise in a manner not further represented. Each of the first and second cylinder chambers 7, 8 may be filled with a fluid (e.g., hydraulic fluid), which is displaced by the respective first and second pistons 9, 10 when the first and second pistons 9, 10 move in an axial direction. In order to allow the hydraulic fluid to pass to opposing sides of the first piston 9, a first bypass duct 13, which extends in the axial direction A and is connected at both ends to the first cylinder chamber 7, is formed outside the first cylinder chamber 7. A second bypass duct 14, which likewise extends in the axial direction A and is connected at both ends to the second cylinder chamber 8, is correspondingly formed outside the second cylinder chamber 8. The damping action of the respective first and second damper units 5, 6 is substantially influenced by the flow resistance of the hydraulic fluid as it runs through the respective first and second bypass ducts 13, 14. This may in turn in each case be influenced by a solenoid valve (e.g., first solenoid valve 15 and second solenoid valve 16), which may be assigned to the respective first and second bypass ducts 13, 14. Each of the first and second solenoid valves 15, 16 may have a plurality of settings, by means of which it is possible vary the fluid flow in the first and second bypass ducts 13, 14. In this respect, both of the first and second damper units 5, 6 may be seen as semi-active dampers. Both of the first and second solenoid valves 15, 16 may be connected to a control unit 20, which in turn receives data (directly or indirectly) from at least one sensor 21. The at least one sensor 21 may be an acceleration sensor or position sensor, which gives information on the present driving state of the vehicle. However, additionally or alternatively, the at least one sensor may include a road surface sensor, for example, giving information on the running surface ahead of the vehicle. In some examples, the road surface sensor may be a Lidar sensor.

FIG. 2 is a diagram showing the main components of the suspension unit 1 and various displacements and forces. The vehicle body 30, which has a mass $M_b$, is connected to the wheel carrier 31, which has a mass $M_w$, on the one hand via the shock absorber unit 2 and on the other via a spring unit 17, which is arranged in parallel with the shock absorber unit 2 in respect of the flux of force. The cylinder unit 3, including the hydraulic fluid contained therein and the first and second solenoid valves 15, 16, has a mass $M_d$. The wheel carrier 31 is connected to the vehicle wheel 32, which is rotatably supported thereon. The vehicle wheel 32 experiences a vertical displacement $Z_r$ due to unevenness in the running surface. The horizontal displacements of the wheel carrier 31, the cylinder unit 3 and the vehicle body 30 are hereinafter denoted by $Z_w$, $Z_d$ and $Z_b$. The motion of the vehicle body 30 is described by following equation:

$$\ddot{Z}_b = g - \frac{F_s + F_{db}}{M_b}$$

where g is the gravitational acceleration, Fs is the force imparted by the spring unit 17 and $F_{db}$ is the force acting between the vehicle body 30 and the cylinder unit 3, which is transmitted by the first damper unit 5. The following equation describes the motion of the wheel carrier 31:

$$\ddot{Z}_w = g + \frac{F_{dw} + F_s - F_t}{M_w}$$

where $F_{dw}$ is the force acting between the wheel carrier 30 and the cylinder unit 3, which is transmitted by the second damper unit 6, and $F_t$ is the force of the vehicle wheel 32 acting on the wheel carrier 30. Finally, the following equation describes the motion of the cylinder unit:

$$\ddot{Z}_d = g + \frac{F_{db} - F_{dw}}{M_d}.$$

The precise solutions of these systems of interlinked equations of motion may depend, among other things, on the variable force $F_t$ exerted by the vehicle wheel 32 as a function of the road structure. Qualitatively, it is nevertheless the fact that the motion of the wheel carrier 31 is substantially influenced by the damping action inside the second damper unit 6, whilst the motion of the vehicle body 30 is substantially influenced by the damping action inside the first damper unit 5. To put it in another way, with regard to the damping action, the vehicle body 30 and the wheel carrier 31 do not move primarily in relation to one another but each in relation to the cylinder unit 3. For optimum road holding, therefore, a comparatively hard damping may be set inside the second damper unit 6, whilst at the same time a comparatively soft damping can be set in the first damper unit 5, which ensures an optimum ride comfort. Both damping actions can be dynamically adjusted by the control unit 20 as a function of the prevailing situation.

Accordingly, a suspension system for a motor vehicle may be provided. The suspension system includes a shock absorber unit operably coupled between a vehicle body and a wheel carrier. The shock absorber unit includes a first damper unit having a first cylinder chamber, a second damper unit having a second cylinder chamber, a first piston connected to a first piston rod, a second piston connected to a second piston rod, and an adjusting unit. The first and second cylinder chambers may each be filled with a fluid. The first and second cylinder chambers may be formed in a common cylinder unit and sealed off from one another. The first and second piston rods may be arranged axially displaceable in the first and second cylinder chambers, respectively. The first piston rod may be operably coupled to the vehicle body and the second piston rod is operably coupled to the wheel carrier. Damping actions of the first and second damper units are changed independently of one another by the adjusting unit.

The suspension system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the first and second cylinder chambers may be arranged axially in series. In an example embodiment, the adjusting unit may include a valve adjustable to change flow rate in a corresponding one of the first cylinder chamber or second cylinder chamber. In some cases, the valve may be a solenoid valve. In an example embodiment, the first damper unit may include a first bypass duct running outside the first cylinder chamber and connected to opposing axial ends of the first cylinder chamber, and the second damper unit may include a second bypass duct running outside the second cylinder chamber and connected to opposing axial ends of the second cylinder chamber. The flow of fluid from opposing sides of the first piston and the second piston may be controlled by the adjusting unit adjusting a corresponding valve in a respective one of the first and second bypass ducts. In some cases, the first damper unit and the second damper unit may be hydraulic damper units, and each of the first and second cylinder chambers may be filled with hydraulic fluid. In an example embodiment, the system may further include a spring unit connected at opposing ends thereof to the vehicle body and the wheel carrier in parallel with the shock absorber unit. In some cases, the system may further include a control unit and a sensor. The control unit may be configured to change damping actions of the first and second damper units independently of each other based on sensor data provided by the sensor. In an example embodiment, the sensor data may be indicative of a present driving state of the vehicle. In such examples, the sensor may be an acceleration sensor or a position sensor. In an example embodiment, the sensor data may be indicative of a road surface ahead of the vehicle. In such an example, the sensor may be a Lidar sensor. In some cases, the adjusting unit may include a first adjusting unit and a second adjusting unit, and a damping action of the first damper unit may be changed by the first adjusting unit while a damping action of the second damper unit may be changed by the second adjusting unit. In an example embodiment, the first adjusting unit and the second adjusting unit may each be carried by the cylinder unit. In some cases, the adjusting unit may include a first adjusting unit and a second adjusting unit. A damping action of the first damper unit may be changed by the first adjusting unit and a damping action of the second damper unit may be changed by the second adjusting unit. The suspension system may further include a control unit and a sensor. The control unit may be configured to automatically change damping actions of the first and second damper units by controlling the first and second adjusting units independently of each other based on sensor data provided by the sensor. In an example embodiment, the sensor data may be indicative of both a present driving state of the vehicle and a road surface ahead of the vehicle. In some cases, the control unit changes the damping action of the first damper unit based on the present driving state of the vehicle, and changes the damping action of the second damper unit based on the road surface ahead of the vehicle. In an example embodiment, the sensor may include an acceleration or position sensor to provide the present driving state of the vehicle, and the sensor may include a road surface sensor to provide the road surface ahead of the vehicle. In some cases, the road surface sensor may be a Lidar sensor.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A suspension system for a vehicle, the suspension system comprising a shock absorber unit operably coupled between a vehicle body and a wheel carrier, the shock absorber unit comprising:
a first damper unit having a first cylinder chamber;
a second damper unit having a second cylinder chamber, the first and second cylinder chambers each being filled with a fluid, the first and second cylinder chambers being formed in a common cylinder unit and sealed off from one another;
a first piston connected to a first piston rod;
a second piston connected to a second piston rod; and
an adjusting unit,
wherein the first and second piston rods are arranged axially displaceable in the first and second cylinder chambers, respectively,
wherein the first piston rod is operably coupled to the vehicle body and the second piston rod is operably coupled to the wheel carrier, and
wherein damping actions of the first and second damper units are changed independently of one another by the adjusting unit.

2. The suspension system of claim 1, wherein the first and second cylinder chambers are arranged axially in series.

3. The suspension system of claim 1, wherein the adjusting unit comprises a valve adjustable to change flow rate in a corresponding one of the first cylinder chamber or second cylinder chamber.

4. The suspension system of claim 3, wherein the valve is a solenoid valve.

5. The suspension system of claim 1, wherein the first damper unit includes a first bypass duct running outside the first cylinder chamber and connected to opposing axial ends of the first cylinder chamber,
wherein the second damper unit includes a second bypass duct running outside the second cylinder chamber and connected to opposing axial ends of the second cylinder chamber, and
wherein the fluid from opposing sides of the first piston and the second piston is controlled by the adjusting unit adjusting a corresponding valve in a respective one of the first and second bypass ducts.

6. The suspension system of claim 1, wherein the first damper unit and the second damper unit are hydraulic damper units, and each of the first and second cylinder chambers is filled with hydraulic fluid.

7. The suspension system of claim 1, further comprising a spring unit connected at opposing ends thereof to the vehicle body and the wheel carrier in parallel with the shock absorber unit.

8. The suspension system of claim 1, further comprising a control unit and a sensor, the control unit being configured to change damping actions of the first and second damper units independently of each other based on sensor data provided by the sensor.

9. The suspension system of claim 8, wherein the sensor data is indicative of a present driving state of the vehicle.

10. The suspension system of claim 9, wherein the sensor is an acceleration sensor.

11. The suspension system of claim 9, wherein the sensor is a position sensor.

12. The suspension system of claim 8, wherein the sensor data is indicative of a road surface ahead of the vehicle.

13. The suspension system of claim 12, wherein the sensor is a Lidar sensor.

14. The suspension system of claim 1, wherein the adjusting unit comprises a first adjusting unit and a second adjusting unit, and
wherein a damping action of the first damper unit is changed by the first adjusting unit and a damping action of the second damper unit is changed by the second adjusting unit.

15. The suspension system of claim 14, wherein the first adjusting unit and the second adjusting unit are each carried by the cylinder unit.

16. The suspension system of claim 1, wherein the adjusting unit comprises a first adjusting unit and a second adjusting unit,
wherein a damping action of the first damper unit is changed by the first adjusting unit and a damping action of the second damper unit is changed by the second adjusting unit, and
wherein the suspension system further comprises a control unit and a sensor, the control unit being configured to automatically change damping actions of the first and second damper units by controlling the first and second adjusting units independently of each other based on sensor data provided by the sensor.

17. The suspension system of claim 16, wherein the sensor data is indicative of a present driving state of the vehicle and a road surface ahead of the vehicle.

18. The suspension system of claim 17, wherein the control unit changes the damping action of the first damper unit based on the present driving state of the vehicle, and changes the damping action of the second damper unit based on the road surface ahead of the vehicle.

19. The suspension system of claim 18, wherein the sensor includes an acceleration or position sensor to provide the present driving state of the vehicle, and
wherein the sensor includes a road surface sensor to provide the road surface ahead of the vehicle.

20. The suspension system of claim 19, wherein the road surface sensor is a Lidar sensor.

* * * * *